United States Patent [19]

Stielau

[11] Patent Number: 6,051,623

[45] Date of Patent: *Apr. 18, 2000

[54] PROCESS FOR PRODUCING NEW POLYMERS BASED ON OIL OF CASHEW-NUT SHELLS, AND PRODUCTS OBTAINED THEREFROM

[76] Inventor: Martin Ernst Stielau, Melides, Caveira, P-7570, Grandola, Portugal

[*] Notice: This patent issued on a continued prosecution application filed under 37 CFR 1.53(d), and is subject to the twenty year patent term provisions of 35 U.S.C. 154(a)(2).

[21] Appl. No.: 09/011,894

[22] PCT Filed: Aug. 20, 1996

[86] PCT No.: PCT/PT96/00007

§ 371 Date: Apr. 23, 1998

§ 102(e) Date: Apr. 23, 1998

[87] PCT Pub. No.: WO97/07150

PCT Pub. Date: Feb. 27, 1997

[30] Foreign Application Priority Data

Aug. 21, 1995 [PT] Portugal ................................. 101761
Apr. 4, 1996 [PT] Portugal ................................. 101863

[51] Int. Cl.$^7$ ..................................................... C08G 18/32
[52] U.S. Cl. ............................. 521/170; 521/172; 528/1; 528/74.5; 528/80; 528/85
[58] Field of Search .................................. 521/170, 172; 528/1, 74.5, 85, 80

[56] References Cited

U.S. PATENT DOCUMENTS 4,301,254 11/1981 Blount ...................................... 521/154
4,631,322 12/1986 Isayama et al. ......................... 521/136

*Primary Examiner*—Morton Foelak
*Attorney, Agent, or Firm*—Locke Reynolds LLP

[57] ABSTRACT

The present invention relates to processes and products made of a natural component being cashew nut shell oil (CNSO) and another component being di- and/or polyisocyanates. Since the CNSO is a mixture of a biphenol and a fatty acid, both of which have a benzenoid ring with phenyl radicals and side chains, one of which has three double bonds, the isocyanates can react on three different levels:
I. The COOH of the fatty acid
II. The OH of the phenyl radicals
III. The double bonds of the chains.

10 Claims, No Drawings

PROCESS FOR PRODUCING NEW POLYMERS BASED ON OIL OF CASHEW-NUT SHELLS, AND PRODUCTS OBTAINED THEREFROM

APPLICATION FIELDS

The present invention concerns polymers made of cashew nut shell oil (hereinafter referred to as CNSO), which together with di- and/or polyisocyanates can constitute many different molecular structures.

PRIOR ART

CNSO is a by-product of the cashew nut preparation food industry.

This liquid, which is found in the shell of the nut and is released when the shell is opened, is a 9:1 mixture of a fatty acid (anacardic acid, which has one phenyl radical at the benzenoid ring) and a diphenol (Cardol), both with side chains with 15 carbon and 27 hydrogen atoms and one with three double bonds.

The current uses of this product are mainly in the field of phenoplastics, where, by neglecting the double bonds of the chains:

the fatty acid is decarboxylated with a small quantity of sulphuric acid;

the phenyl radicals are then reacted with aldehydes. The results are products characterised by their great resistance to heat and abrasion.

Showa's Japanese patent no. 33-27 905 of $1^{st}$ Oct. 1958 contains a new application for this product by reacting it with di- and/or polyisocyanates. This method of manufacturing polyurethane, owing to a reaction between the CNSO and a polyisocyanate, demonstrates the possibility of dimerising the CNSO in the presence of a polymerisation catalyst at temperatures of up to 140° C. The result of this method is a product with high viscosity, which has to be washed and dried before it is used practically with isocyanates.

German patent no. 2152 606 of $22^{nd}$ Oct. 1971, belonging to Bayer AG, shows in the context of a process for the internal plastification of an epoxy resin, that phenyl radicals can be used to temporarily block the NCO radicals from the excess polyisocyanates of the prepolymers. After a subsequent reaction, when tertiary amines take the place of the phenyls, these remain free in the final product.

CONTENTS OF THE INVENTION

The present invention demonstrates a simpler way of manufacturing polymers made of CNSO and a cleaner way of manufacturing products with blocked NCO radicals, by linking up the free phenyl radicals to an available aldehyde. Thanks to the processes invented, it is possible to manufacture products as varied as rigid foam, elastomers, thermoplastic rubber or single-component resins without solvents.

DESCRIPTION OF THE INVENTION

CNSO can, together with the polyisocyanates, react on three different levels:

1. The COOH of the fatty acid, following the Würtz reaction:

    $RCOOH + OCN = RCO-NHR + CO_2$

2. The double bonds of the side chains, and
3. The phenyl radicals of the rings.

The first level is always interesting when a product is intended to be expanded. Thus, with the simultaneous attack of a polyisocyanate on the three levels, a rigid foam of excellent quality can be obtained. Different components which can be polymerised can be obtained either by simply heating the CNSO or by the following method: add a small quantity of diluted sulphuric acid to the CNSO and heat. At around 130° C., the $CO_2$ of the carboxyl is released. By heating further, concentration and dimerisation increase. By adding a polyisocyanate, more or less reticulated products are obtained.

In relation to the above-mentioned Bayer patent and the possibility of temporarily blocking the NCO radicals of an isocyanate, the following method is used: CNSO is heated up to 180° C. with a small quantity of diluted sulphuric acid, it is left to cool down to 120° C. and then an equivalent quantity of TDI is added. This mixture is kept at 80° C. until there is no more free isocyanate.

Starting with such a product and adding a second one, it is easy to manufacture a single-component glue.

This second component would be, for example, a mixture of CNSO and Furfural, which had been heated beforehand with a small quantity of triethylamine and then cooled down to room temperature. (It has been discovered that such a mixture remains stable at this temperature.)

If the quantity of Furfural in the second mixture corresponds to the total quantity of decarboxylated CNSO and the mixture of the first preparation is heated up with the mixture of the second preparation to a temperature higher than 150° C., then the initially blocked NCO radicals will be released and react with the COOH of the second preparation. The phenyl radicals react with the Furfural and give a very brilliant, hard but nevertheless flexible product.

As in the Bayer patent, the preparation with the blocked isocyanate can be used to flexibilize epoxy resins or, by heating it up, to make elastic products.

As explained in the example below, an equivalent mixture of CNSO and Furfural can be used as a component for the manufacture of a rigid foam, provided that a polyisocyanate can react beforehand with the OH of the CNSO carboxyls.

EXAMPLE 1

A mixture of 100 g of CNSO and 28 g of Furfural is heated up to 150° C. This is quickly mixed with either 32 g of TDI or 49 g of MDL resulting in expansion, reticulation and hardening. The resulting rigid foam acquires its final characteristics after a few days.

EXAMPLE 2

Here follows the quantification of the manufacture of the above-mentioned single-component glue.

A first mixture of 34 g of CNSO and 19 g of Furfural is heated up to 150° C., while stirring.

A second mixture containing 34 g of CNSO and 0.68 g of sulphuric acid (50%) is heated up to 170° C., cooled down to 1 10° C. and completed with 7 g of TDI. It is stirred slowly for 4 hours under nitrogen at a temperature of 70° C. and then cooled down.

By mixing the first preparation with the second one, a stable liquid is obtained, which has a temperature higher than 140° C., when the NCO radicals are released from the phenyl radicals and can react with the COOH of the CNSO from the first mixture. The free phenyl radicals react with the rest of the Furfural from the first mixture.

EXAMPLE 3

In order to produce rigid foam, 100 g of CNSO are mixed with 90 g of MDI. The exothermic reaction and expansion are almost immediate. Hardening occurs about an hour later, depending on the temperature.

EXAMPLE 4

100 g of CNSO are heated up to 300° C. then cooled down to room temperature. 40 g of MDI are added and the preparation is mixed well. After the exothermic reaction, a duromer of good mechanical and chemical resistance is obtained.

I claim:

1. Process for manufacturing a rigid foamed plastic material made of CNSO, the phenyl radicals of which are temporarily blocked by NCO radicals of a di- and/or polyisocyanate, characterized by:
   a) the partial decarboxylation of the CNSO by the addition of a small quantity of diluted sulphuric acid,
   b) the addition of an equivalent quantity of TDI before dimerisation of the CNSO by heating, and
   c) renewed heating until the isocyanate is entirely blocked.

2. Process for manufacturing a rigid foamed plastic material made of CNSO which precondenses with an aldehyde and characterized by:
   a) the heating of the CNSO with a small quantity of triethylamine up to approximately 170° C.,
   b) the addition of an equivalent quantity of an aldehyde, and
   c) renewed heating until condensation begins.

3. Process for manufacturing a rigid foamed polymer, characterized by the fact that a di- or polyisocyanate reacts with CNSO which has been previously partially decarboxylated by adding a small quantity of sulphuric acid before heating at a temperature higher than 140° C.

4. Process of claim 3 characterized by the fact that a di- or polyisocyanate reacts with CNSO after this CNSO has been treated mainly by heating.

5. Foamed products that are made in accordance with the processes in claims 1, 2 or 3.

6. The process of claim 2 wherein the aldehyde comprises Furfural.

7. Process for manufacturing polyurethane using CNSO characterized by the selective reaction of the different OH-groups of the CNSO with polyisocyanates.

8. The process of claim 7 characterized by the reaction of both the phenol OH- groups and the carboxyl OH- groups of the CNSO react with a polyisocyanate to produce a foam.

9. The process of claim 7 characterized by the complete decarboxylation of the CNSO before any reaction with the polyisocyanates.

10. Products that are made in accordance with the processes in claims 7, 8 or 9.

* * * * *